United States Patent [19]
Futch et al.

[11] Patent Number: 5,655,008
[45] Date of Patent: Aug. 5, 1997

[54] SYSTEM AND METHOD FOR PERFORMING A VARIETY OF TRANSACTIONS HAVING DISTRIBUTED DECISION-MAKING CAPABILITY

[75] Inventors: Donald R. Futch, Columbia; Richard E. Greer, Greenville, both of S.C.

[73] Assignee: Dart, Inc., Columbia, S.C.

[21] Appl. No.: 487,070

[22] Filed: Jun. 7, 1995

[51] Int. Cl.$^6$ ................................................. H04M 11/00
[52] U.S. Cl. .................... 379/91.01; 395/217; 379/144
[58] Field of Search ................................. 379/91, 93, 94, 379/96–99, 114, 115, 144, 155, 90, 110, 201; 364/400, 401, 406, 408; 235/379–381; 348/3, 6, 7, 13; 902/1, 5, 24; 395/201, 215–217

[56] References Cited

U.S. PATENT DOCUMENTS

| | | | |
|---|---|---|---|
| 4,649,563 | 3/1987 | Riskin . | |
| 4,734,858 | 3/1988 | Schlafly . | |
| 4,799,156 | 1/1989 | Shavit et al. . | |
| 4,947,028 | 8/1990 | Gorog . | |
| 5,007,084 | 4/1991 | Materna et al. | 379/91 |
| 5,220,501 | 6/1993 | Lawlor et al. . | |
| 5,323,448 | 6/1994 | Biggs | 379/91 |
| 5,383,113 | 1/1995 | Kight et al. . | |
| 5,396,546 | 3/1995 | Remillard | 379/96 |
| 5,404,393 | 4/1995 | Remillard | 379/96 |
| 5,416,831 | 5/1995 | Chewning, III et al. | 379/96 |
| 5,475,740 | 12/1995 | Biggs, Jr. et al. | 379/91 |

OTHER PUBLICATIONS

A prior art brochure entitled "Introducing Simple Tran"; undated.

A prior art brochure entitled "Audio Response Capture" by Electronic Merchant Services of Columbia, SC; undated.

*Primary Examiner*—Wing F. Chan
*Attorney, Agent, or Firm*—Dority & Manning

[57] ABSTRACT

A system and method whereby a multiplicity of users may perform a variety of transactions, such as a product/service request, a bill payment request and long distance telephone service, through a system operator. The system includes a plurality of telephone instruments respectively having a telephone identifier and a wallet card swipe reader or the like for inputting a user identifier. A plurality of user actuators, such as individual buttons, are located on the telephone instrument to initiate a request for a particular transaction. A system processor in communication with the telephone instrument determines which type of transaction is being requested and determines whether the request is valid. Preferably, the validity check is completely performed at a gateway computer having a validity table in its memory corresponding to the particular telephone instrument. The gateway computer stores all transaction requests accrued over a period of time in its memory and forwards them to a central computer at a predetermined regular time. The central computer then correlates the transaction request with complete information in its database to carry out the transaction as requested.

22 Claims, 8 Drawing Sheets

SYSTEM AND METHOD FOR PERFORMING A VARIETY OF TRANSACTIONS HAVING DISTRIBUTED DECISION-MAKING CAPABILITY

BACKGROUND OF THE INVENTION

The present invention relates to a computer-based system and method by which a multiplicity of users may perform a variety of transactions through a system operator. More particularly, the invention relates to such a system and method which includes distributed decision-making capability to enhance transaction speed and redundancy.

Various computer-based systems have been proposed to allow a multiplicity of users to perform selected transactions. For example, systems have been implemented whereby a system operator will, on behalf of a consumer, pay bills rendered to the consumer by a billing entity. The payment itself may take various forms, including a consolidated check or an electronic funds transfer. At least one such system, shown in U.S. Pat. No. 5,383,113 to Kight et al., effects electronic funds transfer utilizing the Federal Reserve automated check clearing house (ACH) system. At least one other such system, i.e., that shown in U.S. Pat. No. 5,220,501 to Lawlor et al., utilizes the bank automatic teller machine (ATM) network.

Other computer-based systems have been proposed which allow consumers to order a variety of goods and services. Such systems generally include a remote telecommunications device functionally connected to a computer facility. The consumer selects the desired goods or services on the telecommunications device, which transmits this information to the computer facility. The computer facility notifies the provider of the desired goods or services that an order has been made. Examples of systems by which a consumer may order various goods or services are shown in U.S. Pat. No. 4,947,028 to Gorog, U.S. Pat. No. 4,799,156 to Shavit et al., and U.S. Pat. No. 4,734,858 to Schlafly.

Many of the above systems are designed to be utilized with a personal computer. While personal computers are becoming more commonplace, most people still do not have a personal computer at their disposal. In fact, many individuals remain somewhat uneasy about using a personal computer.

Other systems utilize a "screen phone" device distributed by the system operator. While these devices may be somewhat easier to use than a personal computer, many consumers still find their use relatively difficult. As a result, such consumers are deterred from using the overall system.

In addition, prior art systems generally tend to access the entire database of consumer information when deciding whether a particular transaction is allowed. In other words, a central computer facility having detailed consumer account and demographic information is accessed in order to determine whether the consumer is permitted, for example, to pay a bill. Thus, the time required to make a validity decision regarding the transaction is significantly increased. In addition, a failure of the central computer will often result in the entire system being "down."

SUMMARY OF THE INVENTION

The present invention recognizes and addresses the foregoing disadvantages, and others, of prior art constructions and methods.

Accordingly, it is an object of the present invention to provide an improved computer-based system by which a multiplicity of users may perform a variety of transactions.

It is another object of the present invention to provide an improved system of the type described which performs a validity analysis of the requested transaction relatively quickly.

It is a further object of the present invention to provide an improved system of the type described which is relatively easy to use.

It is another object of the present invention to provide a system of the type described which incorporates a degree of redundancy to enhance fault tolerance.

It is another object of the present invention to provide an improved method by which a system operator may pay bills on behalf of consumers.

Some of these objects are achieved by a system for use by a multiplicity of users to perform a variety of transactions through a system operator. Such transactions include payment of bills rendered to the user by a third party, various requests for products or services, and closed-network long distance telephone service. The system automatically collects payment for the transactions from the user, such as by electronic funds transfer from the user's bank account.

The system comprises a plurality of telephone instruments respectively having an electronic telephone identifier. The telephone instruments further include means, such as a wallet card swipe reader, for inputting a user identifier. In addition, each of the telephone instruments has a plurality of user actuators thereon respectively indicative of a particular transaction. In exemplary constructions, the user actuators are respective buttons on the face of the telephone instrument.

When a particular user actuator is selected, system processor means in communication with a respective telephone instrument function to receive at least the telephone identifier therefrom. The system processor means are further able to determine which of the types of transactions is being requested based on which user actuator was selected by the user.

The system processor means preferably includes at least one gateway computer for receiving transaction requests from the telephone instruments. In presently preferred embodiments, a plurality of gateway computers are provided, functionally arranged in parallel. A central computer in communication with the gateway computers functions to forward a payment command to the payment means for completing the bill payment transaction. Preferably, the gateway computers include log means for storing information regarding each transaction received during a selected period and forwarding such information to the central computer in batch at a predetermined time.

Each of the gateway computers further includes table means for storing therein a plurality of tables corresponding to respective of the telephone instruments. Validity processor means of the gateway computers function to check whether requests for bill payment received from the telephone instruments are valid. The validity processor means preferably performs this validity check by receiving both the telephone identifier and the user identifier, and comparing the identifiers with data in a table corresponding to the particular telephone instrument.

In some exemplary constructions, communication between the telephone instruments and gateway computers is facilitated by a plurality of voice response units. The voice response units may function to return a reference number to the user indicating receipt of a valid request for bill payment by the system operator.

Other objects of the invention are achieved by a computer-based method of effecting payment of bills rendered to consumers by third parties. The method comprises a step of providing a telephone instrument to respective of the consumers, each of the telephone instruments including means for communicating a telephone identifier and further including a wallet card swipe reader. A wallet card, having a user identifier magnetically encoded thereon, is also provided to respective of the consumers.

As an additional step, the method includes electronically receiving a request to pay a bill, the request including the telephone identifier and the user identifier. The telephone identifier and user identifier are then checked against a validity table to determine whether the request is valid. If the request is not valid, the transaction is denied.

If the request is valid, an amount to be paid to the third party is received from inputs entered on a keypad of the telephone instrument. The amount to be paid, along with the validity information, forms an abbreviated request bundle. The abbreviated request bundle is later correlated with a complete database containing sufficient information regarding the user and the third party to effect bill payment thereto as requested. Finally, the method involves paying the bill which had been rendered to the user by the third party.

According to a presently preferred methodology, the user is further provided a transaction identifier to reference receipt and acceptance of the request. Another presently preferred methodology involves the step of creating a log in a first computer which contains abbreviated request bundles accrued over a period of time. At a predetermined time, these abbreviated request bundles are forwarded from the first computer to a second computer for respective correlation with the computer database.

Other objects, features and aspects of the present invention are discussed in greater detail below.

BRIEF DESCRIPTION OF THE DRAWINGS

A full and enabling disclosure of the present invention, including the best mode thereof, to one of ordinary skill in the art, is set forth more particularly in the remainder of the specification, including reference to the accompanying drawings, in which.

Figure 1:
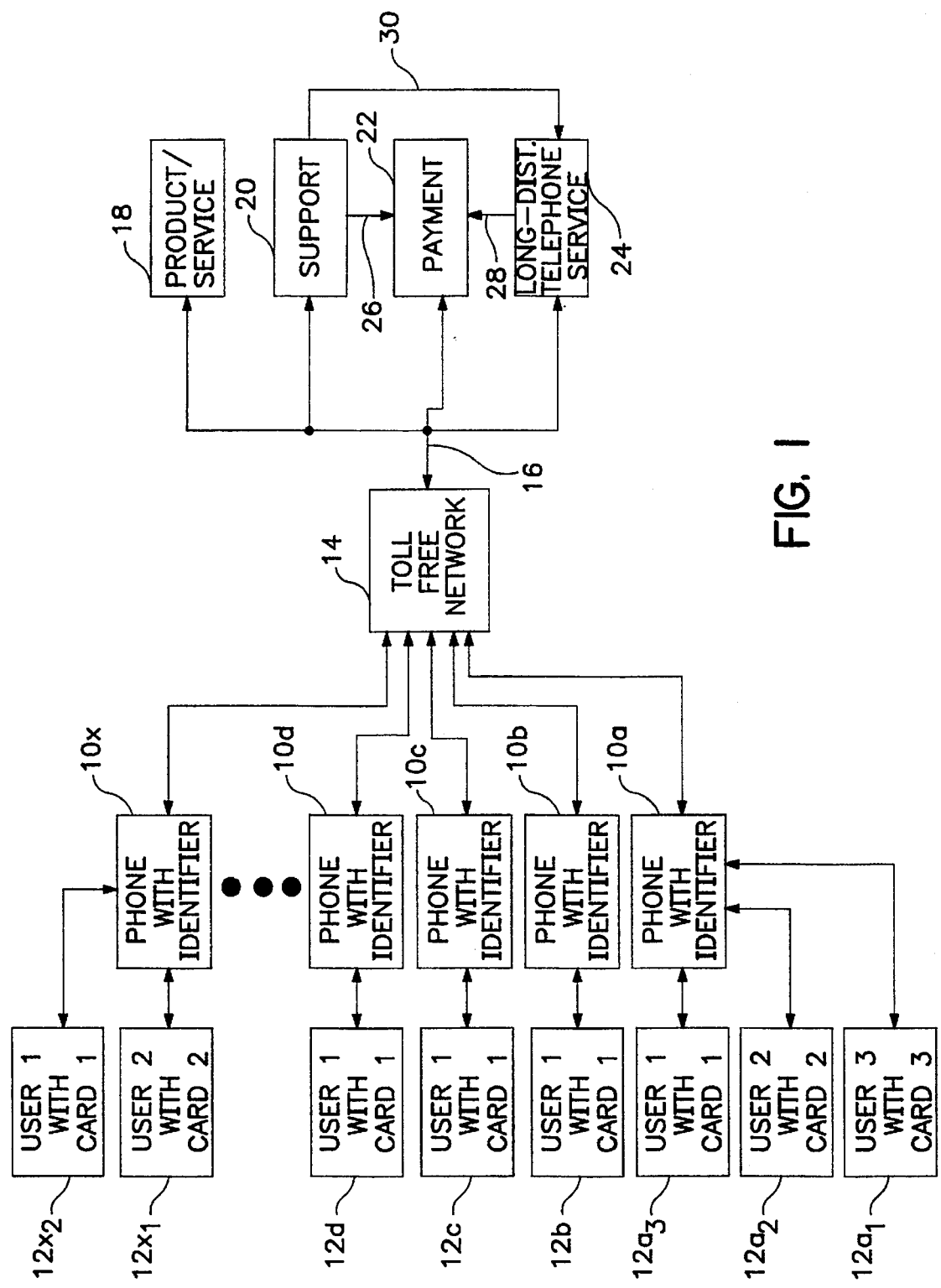
FIG. 1 is a diagrammatic overview of a system constructed in accordance with the present invention.

Repeat use of reference characters in the present specification and drawings is intended to represent same or analogous features or elements of the invention.

DETAILED DESCRIPTION OF PREFERRED EMBODIMENTS

It is to be understood by one of ordinary skill in the art that the present discussion is a description of exemplary embodiments only, and is not intended as limiting the broader aspects of the present invention, which broader aspects are embodied in the exemplary constructions.

A system according to the present invention for performing a variety of transactions is diagrammatically illustrated in FIG. 1. As can be seen, the system includes an indeterminate multiplicity of telephone instruments 10 (respectively indicated by the reference numbers 10a–10d and 10x) which are distributed to the public. As will be explained more fully below, each such telephone instrument has a unique serial number, or "identifier," which allows it to be electronically recognized by the system operator.

One or more authorized users 12 are associated with each of the telephone instruments 10. For example, telephone instrument 10a has three authorized users, i.e., users $12a_1$, $12a_2$, and $12a_3$. Telephone instrument 10b, however, has only one authorized user 12b in the illustrated example. Like telephone instruments 10, each user 12 also has a unique identifier which the system operator uses to determine whether a particular transaction is authorized.

In the exemplary construction illustrated in FIG. 1, telephone instruments 10 communicate with means for performing various transactions via a toll free network 14. Although details of these means will be discussed more fully below, each is shown generally in FIG. 1 for purposes of overview. First such means 18 are provided for requesting various products or services on behalf of users 12. Another such means, i.e., support center 20, allow new users to be entered into the system as well as also requesting various products or services on behalf of the consumer. Payment means 22 allow the system to pay bills on behalf of users 12.

In addition to the above, long distance means 22 are provided to allow long distance telephone calls to be made by users 12. Preferably, long distance means 22 provide this long distance telephone service through a "closed network." As used herein, the term "closed network" means that only telephone instruments 10 known to the system are authorized to make long distance calls.

For reasons which will be explained below, support center 20 and long distance means 24 are capable of communicating with payment means 22, as diagrammatically illustrated at 26 and 28. Similarly, support center 20 communicates with long distance means 24, as indicated at 30.

Figure 2:
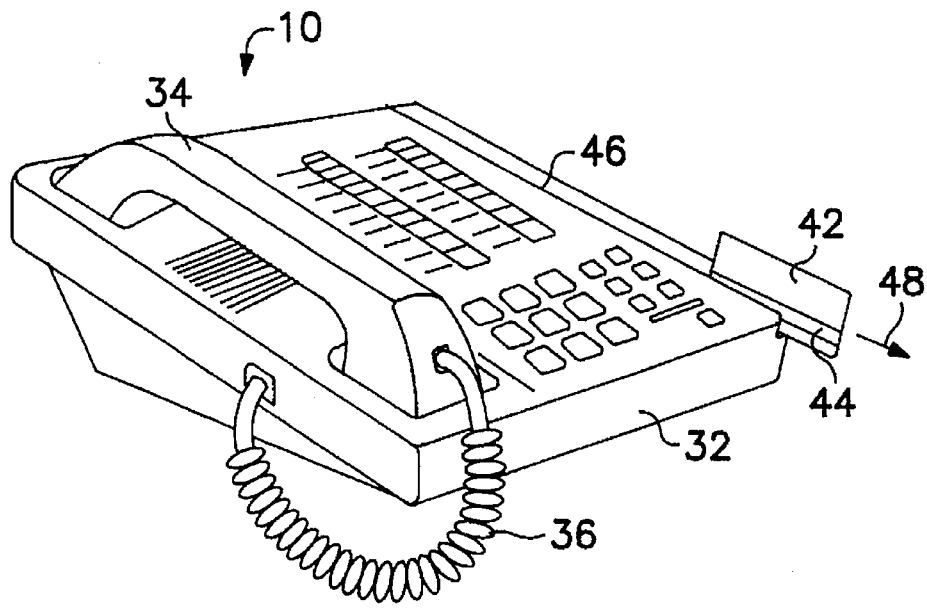
FIG. 2 is a perspective view of a presently preferred telephone instrument for use with the system of FIG. 1.
Figure 3:
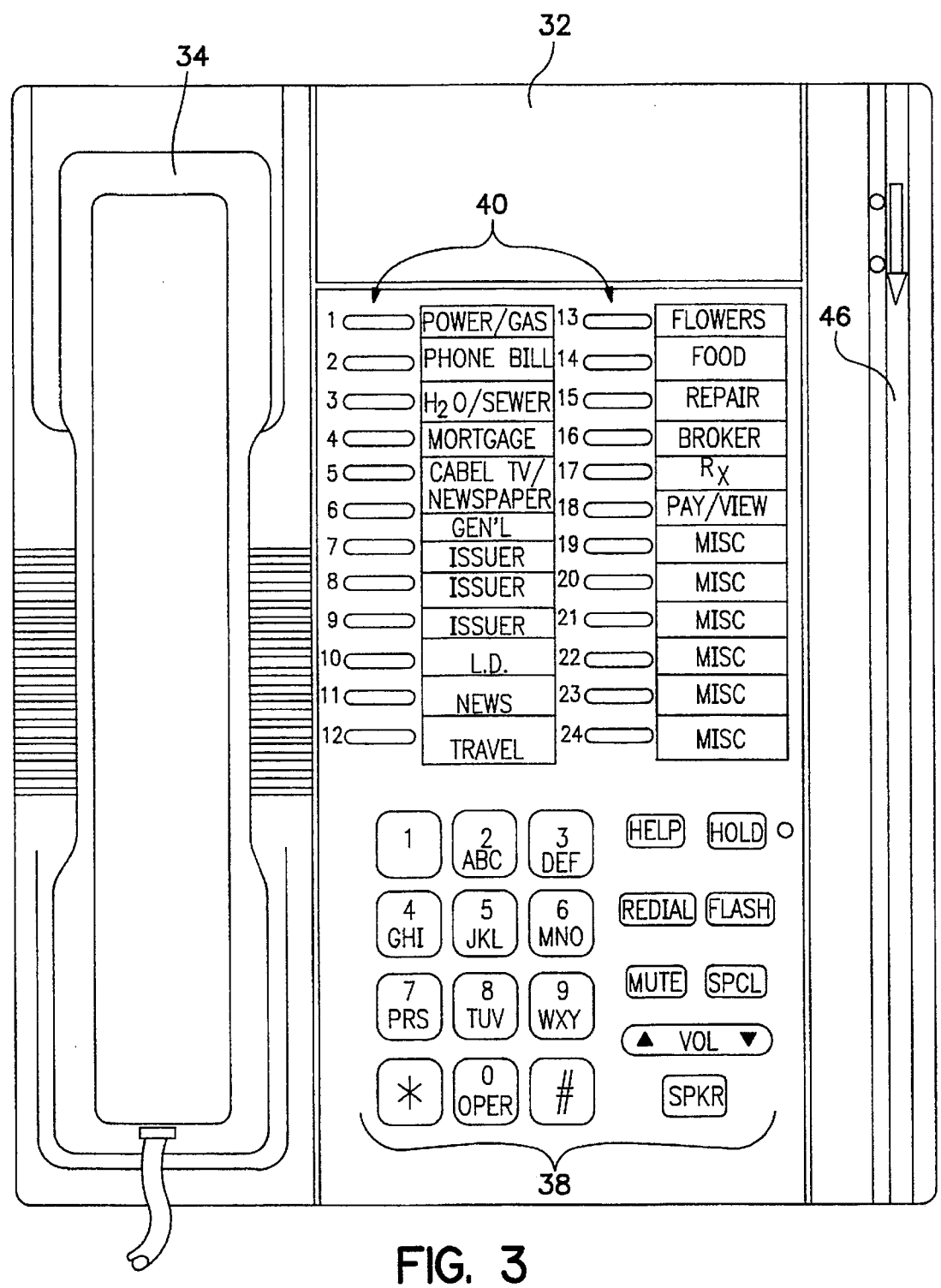
FIG. 3 is an enlarged plan view of the telephone instrument shown in FIG. 2.

FIGS. 2 and 3 illustrate a presently preferred embodiment of telephone instrument 10. As can be seen, instrument 10 resembles a typical touchtone telephone in many respects. For example, instrument 10 includes a base unit 32 and a handset 34 interconnected by a coiled telephone cord 36. Instrument 10 also includes a numbered keypad and various function keys, as indicated generally at 38, which may be found on a typical telephone.

Unlike a typical telephone, however, telephone instrument 10 includes a variety of user actuators respectively corresponding to a desired transaction. In presently preferred embodiments, the user actuators are configured as respective buttons, e.g. buttons labeled 1–24 in the illustrated example (FIG. 3). Upon being pressed a single time, these buttons automatically initiate communication with other parts of the system so that a desired transaction is requested. Indicia located adjacent the buttons 40 indicate the specific type of transaction.

A number of the buttons are preferably reserved for one-touch access to bill payment. In the illustrated embodiment, botton1 through button6 are bill payment buttons arranged as follows:

Botton1—power or gas bill
Button2—phone bill
Button3—water or sewer bill
Button4—mortgage or rent
Button5—cable T.V. or newspaper
Button6—user's general payment list The means by the present invention effects bill payment will be explained in greater detail below.

Often, an issuer of telephone instruments 10 will be a business entity other than the system operator. For example, a business with which a consumer has a special relationship, e.g., a bank, power company, newspaper, etc., may issue the telephone instruments 10 to its customers as a promotion. In this case, button7 through button9 may be reserved for use by the issuer.

As an example, a bank issuer may desire that its customers have one-touch access to interest rates or checking account information. In the case of a newspaper, issuer buttons could be used for product purchases, information processing, classified sales and the like. If a power company is the issuer, these buttons could be used to access outage reporting, meter reading, or for informational services on energy conservation and the like.

Button10 may be utilized to directly access long distance means 24. In other words, a user desiring to make a long distance call through the closed network of the system would press button10. When long distance means 24 provides a return dial tone, the number to be called is dialed via the keypad at 38.

Button11 through button18 are utilized to provide one-touch access to various goods or services. In the illustrated embodiment, these goods or services include:

Button12—travel agency
Button13—florist
Button14—home delivery of food
Button15—home repair
Button16—discount brokerage
Button17—discount pharmacy
Button18—pay per view cable television As noted above, some of these goods or services may be provided by direct access between the user and the provider. These providers may be equipped with appropriate software to recognize the particular user based on the telephone or user identifiers in the manner discussed below. Payment for these goods or services, however, would generally be arranged separately between the user and the provider. Other goods or services may be arranged through the support center 20. In this case, payment for the goods or services would preferably be accomplished through payment means 22.

As shown, button19 through button24 are labeled as miscellaneous buttons. These buttons may be used to access additional goods or services. Alternatively, these buttons may be used as speed dial buttons as are frequently provided on typical telephones.

Telephone instrument 10 also includes a wallet card reader device, preferably of the type satisfying ISO standards 78XX. Such card readers are capable of detecting an alphanumeric code impressed onto a magnetic stripe of a wallet card. In this case, users are each provided a system debit card 42 having a user identifier encoded on magnetic stripe 44. The system thus receives the user identifier when card 42 is swiped at the appropriate time through the reader slot 46 of telephone instrument 10 (as shown by arrow 48).

Figure 4:
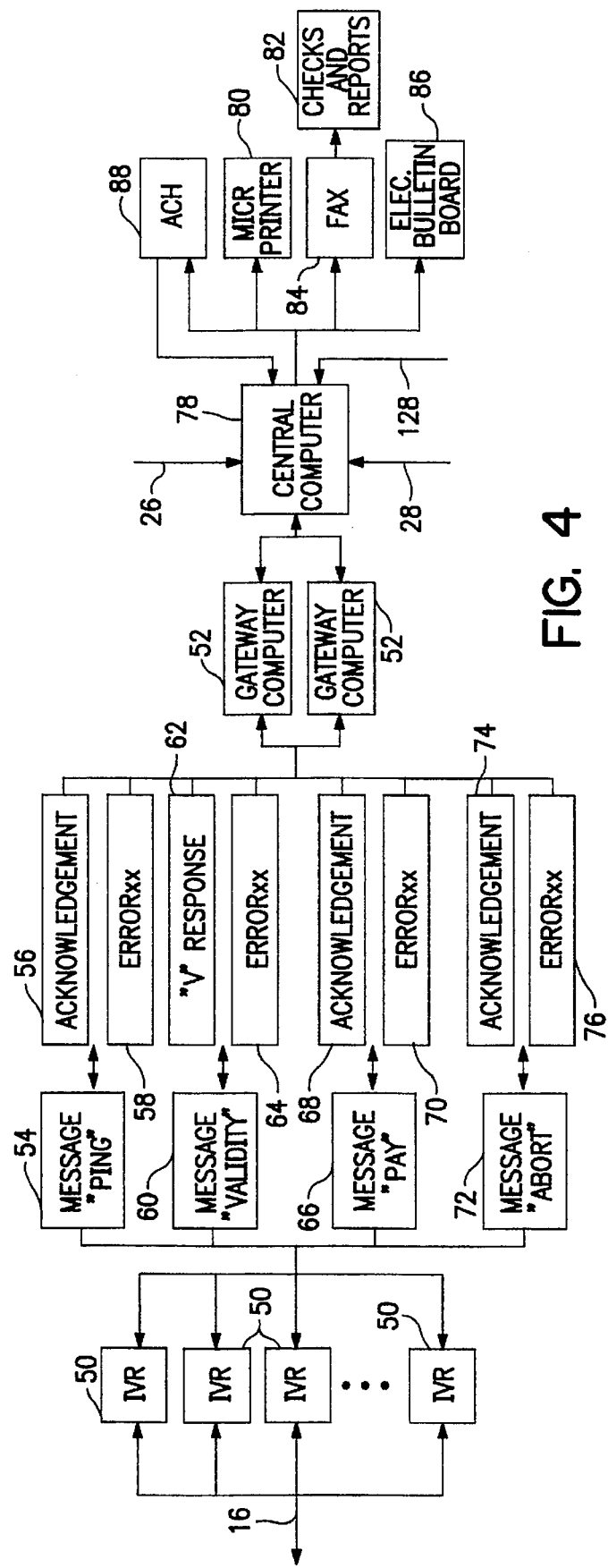
FIG. 4 is a diagrammatic representation of preferred payment means for use with the system of FIG. 1.

Referring now to FIG. 4, the operation of payment means 22 will be described in more detail. As shown, payment means 22 include a plurality of integrated voice response (IVR) units 50 which generate voice messages for communication with the user. Preferably, IVR units 50 are functionally arranged in parallel as shown to give the system redundancy should one unit fail. Additionally, each of IVR units 50 will generally be limited in the maximum amount of calls which it may handle at a given time. A parallel architecture allows the call to be "bounced" to another IVR unit 50 where it can be serviced.

One or more gateway computers 52 are further provided to communicate with IVR units 50 over an interconnecting local area network (LAN). Preferably, bill payment means 22 will include a plurality of gateway computers 52 functionally arranged in parallel as shown. In presently preferred embodiments, gateway computers 52 may each be a HP9000 model E35.

In use, IVR units 50 and gateway computers 52 exchange a number of computer messages to facilitate processing of a transaction request. For example, as indicated at 54, IVR unit 50 may issue a simple "ping" message when a transaction request is first received from one of telephone instruments 10. The "ping" message asks whether one of gateway computers 52 is available to handle the transaction. An available one of gateway computers will respond by issuing an acknowledgement, as indicated at 56. If gateway computers 52 are unavailable, the requesting IVR unit 50 will receive an error, as indicated at 58. The error number, indicated as "XX," will prompt unit 50 to provide a certain voice message to the user.

After a successful "ping," IVR unit 50 will request whether the transaction is valid, as indicated at 60. If gateway computer 52 responds that the transaction is valid, a "V" response will be received, as indicated at 62. If the transaction is not valid, gateway computer 52 will issue an error message as indicated at 64.

If successful communication is established between one of IVR units 50 and one of gateway computers 52, and the transaction is indicated as being valid, the respective IVR unit 50 will send a "pay" message to the respective gateway computer 52, as indicated at 66. The "pay" message informs the gateway computer 52 that a payment is to be made, and the amount of such payment. Gateway computer 52 then issues an acknowledgement, as indicated at 68, that the payment has been accepted. Otherwise, gateway computer 52 issues an error message, as indicated at 70.

If the transaction is interrupted or some other event is detected where such may be appropriate, IVR unit 50 sends an "ABORT" message to gateway computer 52, as indicated at 72. If the "ABORT" message is properly received by gateway computer 52, an acknowledgement is provided, as indicated at 74. Otherwise, an error is generated, as indicated at 76.

After the transaction has been validated and the payment information has been gathered, gateway computers 52 communicate with a central computer 78. From the information provided by gateway computers 52, central computer 78 functions to identify the user and the desired payee. Based on stored information, payment is effected to the payee by one of numerous methods. In presently preferred embodiments, central computer 78 may be a HP9000 model E55. For redundancy, several such central computers may be provided.

One form of payment which may be made to the payee is a lump-sum check drawn on the system operator's bank account. Such a check may be produced by a laser printer 80 having appropriate software giving it the capability to imprint MICR codes. Information regarding the customer accounts to be credited by the check could be provided to the payee in a number of ways. For example, central computer 78 may automatically send an appropriate report 82 via fax modem 84. In the alternative, payment information may be provided by electronic bulletin board 86 through an online service or the Internet if the payee is suitably equipped.

As indicated at 88, payment may also be effected through the ACH if appropriate arrangements have been made with the payee. In many cases, the system operator will not be a bank. Due to Federal Reserve regulations, however, only banks may have direct access to the ACH. Thus, the system operator making payments through the ACH will affiliate with a gatekeeper bank to provide ACH access. The ACH will transfer funds directly from the account of the system operator into that of the payee. A report may be sent to the payee by one of the methods discussed above to apprise the payee of accounts to be credited with the payment.

Alternatively, if the payee has made suitable arrangements with its own bank, it may not be necessary to issue a separate report to the payee of the accounts to be credited. Specifically, the requisite account information can be included in the ACH transfer to the payee's bank.

The ACH also allows the system operator to collect payment for bills paid on behalf of various users. Such funds are electronically transferred from the user's bank account to the bank account of the system operator via the ACH, preferably before a payment is issued to the billing entity. Access to the user's bank account is provided by the ACH prenote procedure. Information for the ACH prenote is gathered from data given by the user in an application completed to become part of the system.

A significant advantage of the present invention is illustrated by the above discussion. Specifically, the system is organized to allow a decision regarding the validity of a particular transaction to be made at gateway computers 52 instead of central computer 78. While the decision-making capability of the system is distributed in this manner, detailed information regarding the identity of the users and their respective bank accounts and the like is maintained at central computer 78. Thus, decision-making capability is distributed without the risk of a security breach. The technique by which the present invention achieves these results will now be described.

Figure 5:
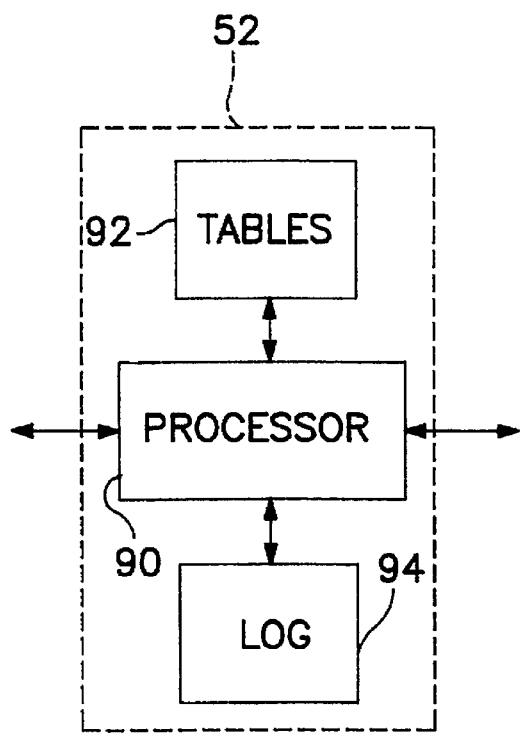
FIG. 5 is a diagrammatic representation showing in greater detail the functional components of a gateway computers as shown in FIG. 4.

Referring to FIG. 5, the functional components of each gateway computer 52 is illustrated in more detail. As can be seen, gateway computer 52 includes a processor 90 in communication with table storage means 92 and log means 94. Table storage means contains a plurality of "tables" having a restricted amount of information regarding each of telephone instruments 10. At stated above, this information is sufficient to allow processor 90 to determine the validity of the desired transaction without compromising security of the system.

As an example, consider the following table which may correspond to one of telephone instruments 10.

TABLE

| | |
|---|---|
| A. | 650114999 |
| B. | 2 |
| C. | 0000000050788363_0000000003456791 |
| D. | 11_2 |
| | 0000001_0000001 |
| E. | 12_2 |
| | 0000001_0000001 |
| F. | 21_2 |
| | 0000002_0000001 |
| G. | 31_2 |
| | 0000003_0000001 |
| H. | 32_2 |
| | 0000003_0000001 |
| I. | 41_4 |
| | 0000005_0000001 |
| | 0000008_0000002 |
| J. | 51_2 |
| | 0000004_0000001 |
| K. | 52_2 |
| | 0000006_0000001 |
| L. | 61_8 |
| | 0000001_0000002_0000003_0000006_0000007_0000008_0000010_0000013 |

For convenience, each table entry has been denominated by one of the letters A through L.

The entry indicated by letter A gives the unique identifier of the telephone instrument to which the table corresponds. In other words, this telephone instrument has an identifier of 650114999. Entry B indicates the number of cards 42 which are authorized to be utilized with the corresponding telephone instrument 10. In this case, the particular telephone instrument has two (2) authorized cards. Entry C gives the user identifier encoded on each of these two cards. The respective user identifiers are separated by an underscore character as shown. The user identifiers may respectively correspond to an individual bank account from which funds are to be drawn for covering a requested bill payment transaction.

Entries D through L contain information corresponding to the specific bill payment transactions permitted on this telephone instrument 10. For example, consider entry D, which corresponds to the botton1 of FIG. 3. It will be recalled that this button allows the payment of a bill rendered by either a power or gas utility.

As can be seen, entry D contains the listing "11_2" on its first line. The first "1" of this listing simply indicates that it corresponds to botton1. The second "1" refers to a number which the user may enter in the telephone keypad to pay a power bill after being prompted by IVR unit 50. The "2" following the underscore indicates the number of fields which follow. The first such field, i.e., 0000001, corresponds to a particular payee. The second field gives the service location for which payment is to be made, e.g., primary residence in this case.

The listing of line E, i.e., $12_2$, indicates that button 1 may also be utilized to pay a gas bill. Thus, the following fields respectively indicate the payee and the location for which payment is to be made. It may be noticed that the payee is indicated in entries D and E by the same number. This is because, in the exemplary case shown, the payee is a utility offering both electric and gas services. It should be understood that, in many cases, the payees for electric and gas will be different.

It should also be appreciated that many users will have multiple payees and/or locations for each category of bills to be paid. For example, a user may have a vacation home in addition to a primary residence. Such a situation is shown by entry I, where the user is authorized to pay mortgage/rent at two locations. In this case, two different mortgagees are to be paid for the primary and vacation residences, and are given by the respective payee numbers "0000005" and "0000008." As will be apparent from the discussion below, these and other field numbers in the Table allow gateway computers 52 to direct IVR units 50 such that the name of the payee and location can be inserted into the voice prompt provided to the user.

Entry L corresponds to button6, the general payments button on telephone instrument 10. The general payments list is constructed by support center 20 based on user request. In this case, a total of eight (8) payees are present in the user's general payments list. In other words, the user may pay any one of these eight payees after button6 is pressed. A detailed listing of multiple table entries and explanations therefor is attached hereto as Appendix A.

Figure 5A:
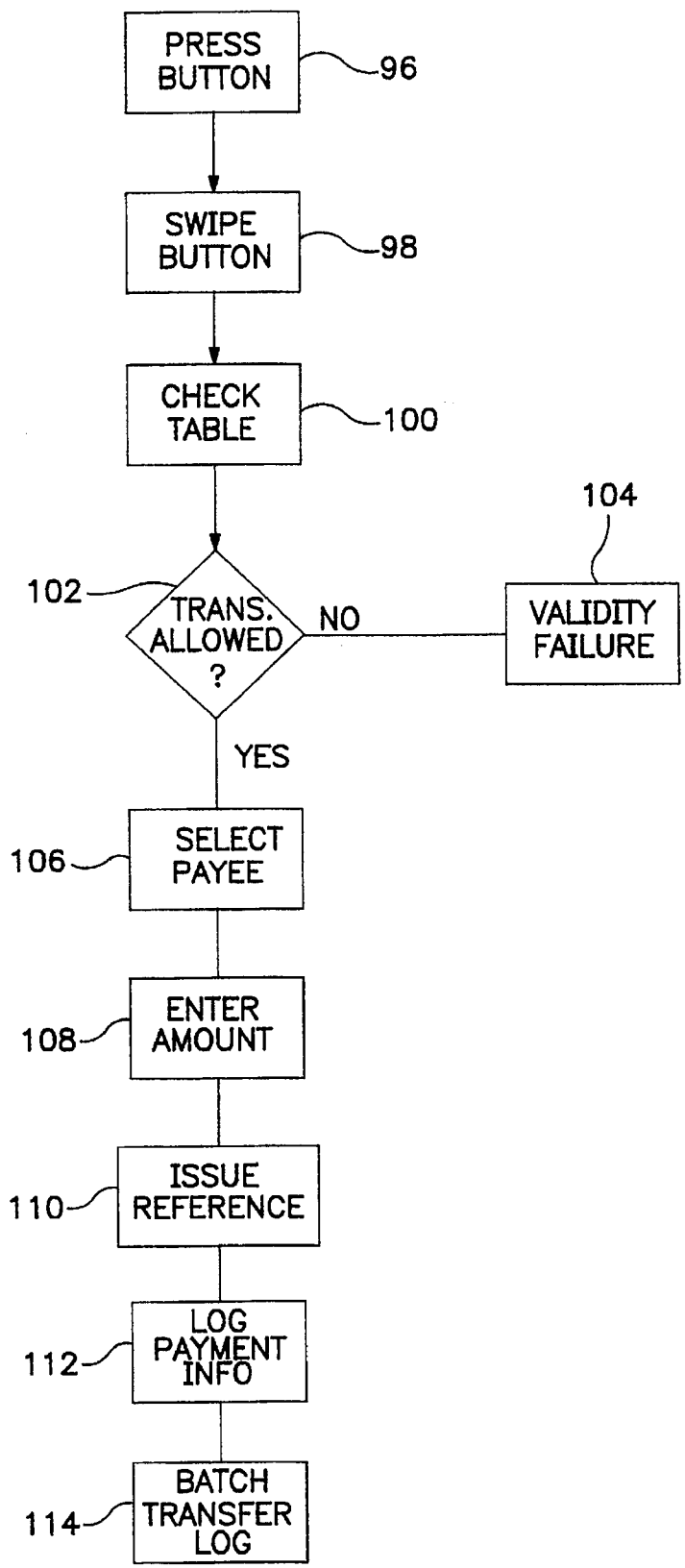
FIG. 5A is a flowchart illustrating a computer process by which the bill payment means of FIG. 4 may function to check transaction validity.

Although some steps of the payment process have been discussed above, a flowchart summary is shown in FIG. 5A for convenience. First, the user presses a selected one of the transaction buttons on telephone instrument 10, as indicated at 96. The user is then prompted to swipe card 42, as indicated at 98. The instrument identifier and user identifier are then provided to gateway computer 52. Gateway computer 52 uses this information to perform a table check, as indicated at 100. Based on the results of the table check, a decision may be made as to whether the transaction is allowed, as indicated at 102. If the transaction is not allowed, a validity failure results, as indicated at 104.

If the transaction is allowed, the user is prompted to select a payee from within the group of payees for the button pressed, as indicated at 106. Next, as indicated at 108, the user is prompted to enter an amount to be paid. The user is then issued a reference number, as indicated at 110, to confirm the occurrence of the transaction.

As indicated at 112, the transaction amount and payee (as shown in the table) is stored in log 94. Because the information in log 94 is sufficient to indicate transaction validity, but insufficient to actually effect payment, it may be referred to as an "abbreviated request bundle." All abbreviated request bundles accrued over a period of time are stored in log 94 in this manner. At a predetermined time, they will be transferred to central computer 78, as indicated at 114, which may then effect payment as described.

It can be seen that the present system performs all of the functions needed to validate and capture a transaction without the assistance of central computer 78. The amount of information in each of the tables is carefully selected so that these functions can occur, but further so that insufficient information will be available in the tables to threaten security. In other words, the information contained in the tables would be useless to an unauthorized person who might gain access through deception.

In addition, the methodology described herein allows the transaction to occur, from the standpoint of the user, at a lesser time than may otherwise be the case. For example, the present system eliminates the need to access voluminous demographic data on the user, the user's bank account and the payee. This architecture also allows transactions to be gathered even if central computer 78 is experiencing a malfunction. Thus, the user will not be inconvenienced.

As an illustration of the transaction as seen by the user, consider the following series of messages generated by IVR unit 50. These messages correspond to an actuation of botton1, for the payment of a power or gas bill:

| BUTTON1 POWER/GAS | |
|---|---|
| Message No. | IVR Message |
| 01 | 1. To pay the power company for electric or electric and gas press 1, to pay the gas company press 2, for other payment options press 3, to exit press 0. |
| 11 | 2. (IF 0 is pressed) Goodbye.<br>2.5 (IF 3 is pressed) Go to message 10. |
| 02 | 3. Please swipe your home banking debit card (allow manual entry if card unable to be read). |
| (IVR checks customer table, payee table, and location name table (local or remote) for validity information and variable information) | |
| 03 | 4. (Validity failure) We're sorry, your phone is not activated or your debit card is not authorized. Please hang up and press the support center button. |
| 11 | 5. Goodbye.<br>5.1 (If gateway returns 3 payees) To pay Payee Co. 1 press 1, To pay Payee Co. 2 press 2, To pay Payee Co. 3 press 3.<br>5.2 (If gateway returns 3 locations for the selected payee) To pay Primary Residence press 1, To pay Second home press 2, To pay Rental property press 3. |
| 04 | 6. Please enter the amount you want to pay, in dollars and cents with no decimal, followed by the pound key. |
| 05 | 7. You have entered _____. |
| 06 | 8. If correct press 1. If incorrect press 0. (If 0 is pressed, loop back to msg.4). |
| 07 | 9. _____ (info from payee table) power/gas company has been paid $_____ from your account. |
| 06 | 10. If correct press 1. If incorrect press 0. (If 0 is pressed, loop back to msg. 4) |
| 08 | 11. Your reference number is _____.<br>To repeat press 1 (If 1 pressed loop back to Msg. 08). To continue press 2. |

Script continues to prompt for and verify the amount. The name of the selected company is played along with the amount, and the reference number is played with a repeat option. If there are multiple locations #5.2 above is repeated for each remaining location, adding, "Or continue, press 0" at the end. After locations are selected or rejected, if there are multiple payees, #5.1 is repeated, again with, "Or to continue, press 0" at the end. After this the caller may select the menu of all payment types.

| 09 | 12. Press 1 for more bill pay services. Press 0 to exit. |
|---|---|
| 11 | 13. (If 0 pressed) Goodbye. |
| 10 | 14. (If 1 pressed) For Power or gas press 1, for telephone press 2, for water or sewer press 3, for mortgage or rent press 4, for Cable TV or newspaper press 5, for general payments press 6. |

(NOTE: If previous transaction had a good card swipe - go to enter amount you want to pay after validity table, location table and payee table information is retrieved for that button #.)

A recitation of dialogue for other bill payment buttons is attached hereto as Appendix B.

Figure 6:
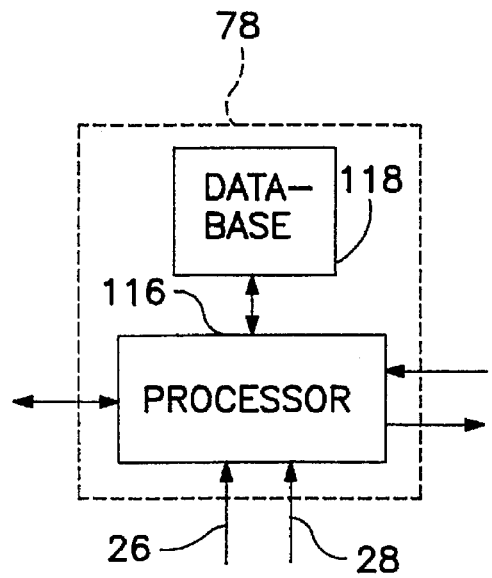
FIG. 6 is a diagrammatic representation showing in greater detail the functional components of a central computer as shown in FIG. 4.

FIG. 6 illustrates the primary functional components of central computer 78. As can be seen, central computer 78 includes a main processor 116 in communication with a database 118. As described above, database 118 contains the detailed information necessary to effect bill payment on behalf of the user as well as other functions performed by the system.

Figure 7:
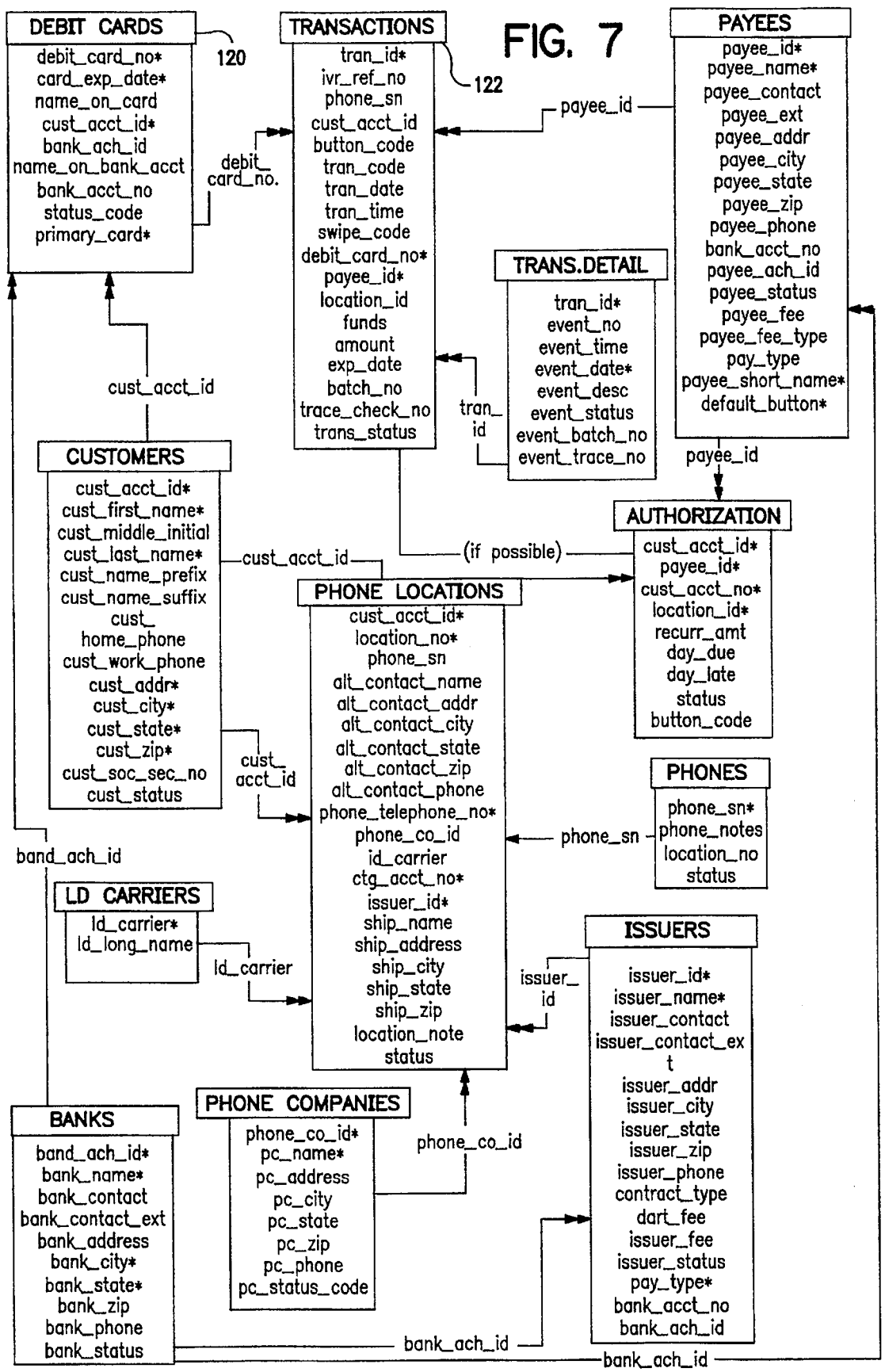
FIG. 7 is a diagrammatic representation of the manner in which database information is stored by the central computer of FIGS. 4 and 6.

In an exemplary embodiment, the information is stored in database 118 using Informix program. As shown in FIG. 7, this program stores the information using "fields" which have therein a plurality of "keys." Further, the fields are functionally interconnected by common keys. For example, field 120, labeled "debit cards," has nine keys. The common key between field 120 and field 122, labeled "transactions," is "debit_card_no."

Figure 8:
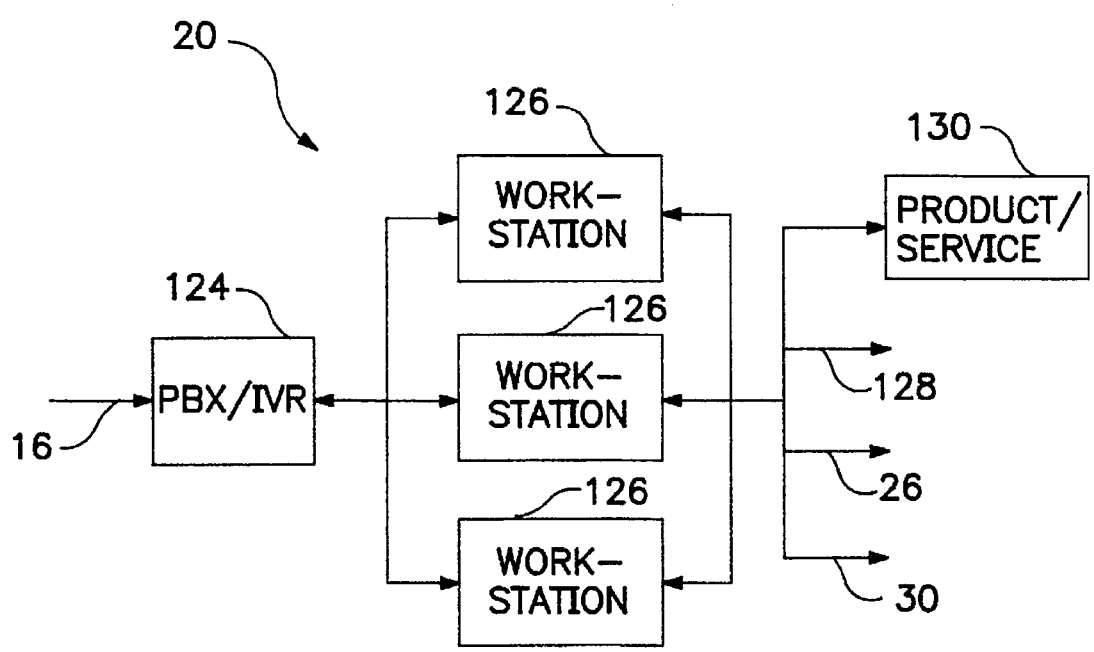
FIG. 8 is a diagrammatic representation of the support center for use with the system of FIG. 1.

A presently preferred embodiment of support center 20 is illustrated in greater detail in FIG. 8. As shown, support center 20 includes a public branch exchange ("PBX") having an IVR, as indicated at 124. PBX unit 124 routes a help request to one of a plurality of workstation computers 126 interconnected on a local area network (LAN). In presently preferred embodiments, computers 126 may be Pentium-based computers having a 100 MHz clock speed and including "Windows for Workgroups" software.

The telephone identifier provided to PBX 124 is then sent to central computer 26, as indicated at 128. Central computer 78 provides the workstation computer 126 with customer information for display as the call is delivered. The attendant of each workstation computer 126 may then see the customer information on the display. As a result, the attendant will be in a position to assist the user.

Among the functions performed at support center 20 is the creation and updating of the database 118 and the tables stored by gateway computers 52. Additionally, the support center 20 may process selected product/service transactions, as indicated at 130. In this case, payment for the product or service is preferably made through payment means 22 instead of independent payment by the user. Thus, as described above, support center 20 communicates with payment means 22 by line 26.

Support center 20 also communicates with long distance means 24, as indicated at line 30. This communication provides notice to the closed network that a particular one of telephone instruments 10 is allowed access to the system.

Figure 9:
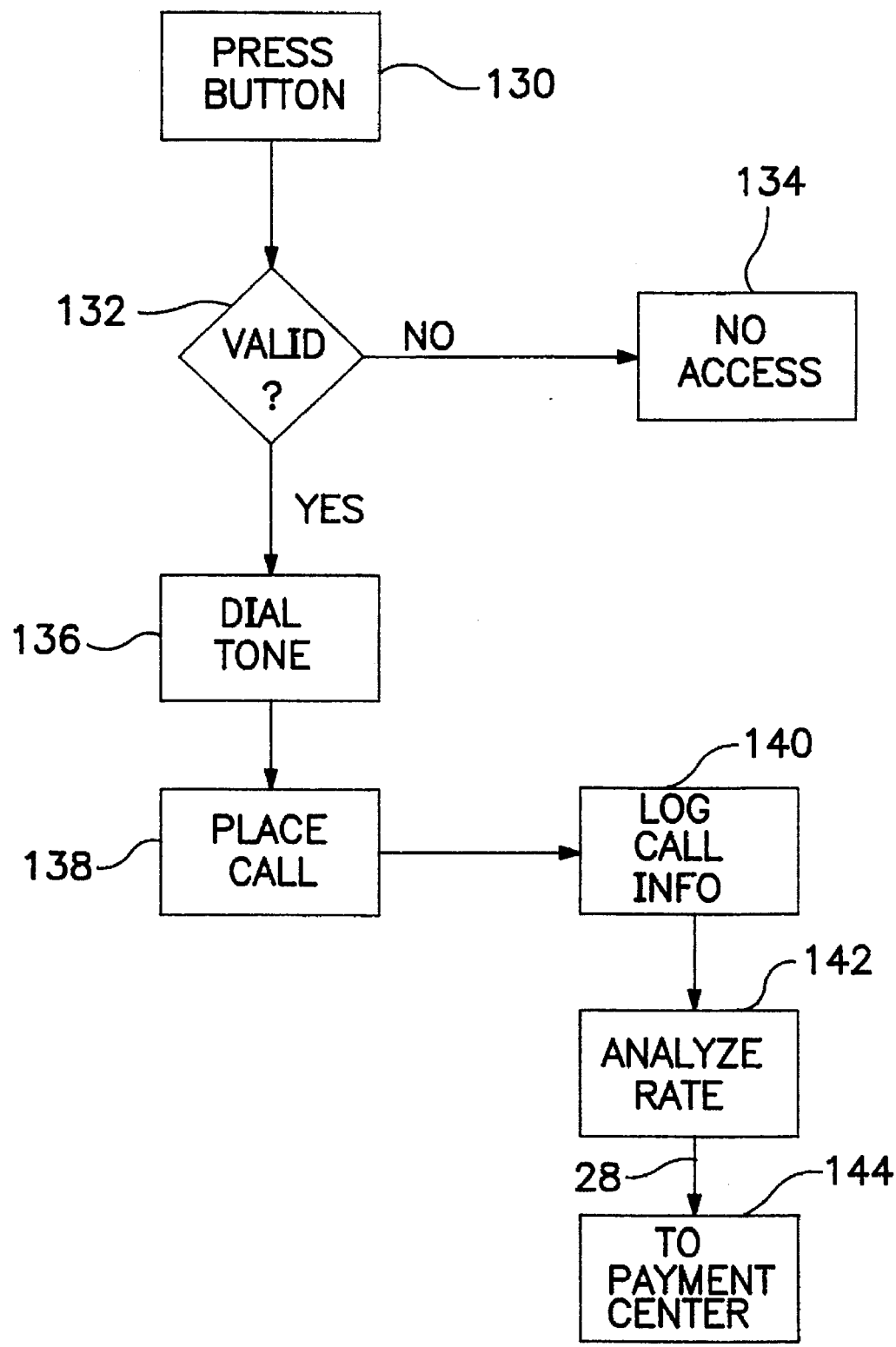
FIG. 9 is a flowchart showing the operation of the means for providing long distance telephone service shown in FIG. 1.

As previously noted, long distance means 24 provides long distance telephone service through a closed network. Referring to FIG. 9, the closed network is first accessed by pressing the appropriate button on telephone instrument 10, as indicated at 130. A computer within long distance means 24 then receives the unique identifier provided by telephone instrument 10. Based on this identifier, the computer determines whether instrument 10 is part of the closed network, as indicated in 132. If the telephone instrument is not part of the closed network, access to the network is denied, as indicated at 134.

If, on the other hand, telephone instrument 10 is part of the closed network, long distance means 24 returns a dial tone, as indicated at 136. The user then places a desired call using telephone instrument 10, as indicated at 138.

As the call is transpiring, various information regarding the destination and length of the call is recorded, as indicated at 140. Before the call is to be billed, its rate is analyzed based on a predetermined criteria, as indicated at 142. In presently preferred embodiments, the predetermined criteria is selected to be lower than at least the largest four long distance carriers. Thus, the amount charged to the user will always be lower than at least these largest four long distance carriers.

After the rate is determined, a charge for the various calls is forwarded to payment means 22, as indicated at 144. The telephone calls may then appear on a consolidated statement from the system operator along with bills paid by payment means 22 and products or services ordered on behalf of the user by support center 20.

While preferred embodiments of the invention and presently preferred methods of practicing same have been shown and described, modifications and variations thereto may be practiced by those of ordinary skill in the art without departing from the spirit and scope of the present invention, which is more particularly set forth in the appended claims. In addition, it should be understood that aspects of the various embodiments may be interchanged both in whole or in part. Furthermore, those of ordinary skill in the art will appreciate that the foregoing description is by way of example only, and is not intended to be limitative of the invention so further described in such appended claims.

APPENDIX A

```
650114999
2
0000000050788363_0000000003456791
11_2
0000001_0000001
12_2
0000001_0000001
21_2
0000002_0000001
31_2
0000003_0000001
32_2
0000003_0000001
41_4
0000005_0000001
0000008_0000002
51_2
0000004_0000001
52_2
0000006_0000001
61_8
0000001_0000002_0000003_0000006_0000007_0000008_0000010_0000013

650114888
1
0000000044488363
11_4
0000001_0000001
0000001_0000002
12_2
0000001_0000001
21_2
```

APPENDIX A-continued

```
0000002_0000001
31_2
0000003_0000001
32_2
0000003_0000001
41_4
0000009_0000001
0000007_0000002
51_2
0000004_0000001
52_2
0000005_0000001
61_8
0000001_0000002_0000003_0000004
0000005_0000010_0000014_0000021

```

ELECTRONIC PAYEE TABLE
0001 SCE&G
0002 Southern Bell
0003 City of Columbia, SC
0004 CVI of Columbia, SC
0005 State Newspaper
.
.
.
0010 Midland Mortgage
0011 Fleet Mortgage
LOCATION TABLE
0001 Primary Residence
0002 2nd Home
0003 Rental Property 1
0004 Rental Property 2
0005 Parent
0006 Child
0007 In-law
0008 Business
0009 Vacation Home
TELEPAY (DART) HOME BANKING VALIDITY TABLE:
*note 1 (field separator = _(underscore character))
*note 2 (button number = (11 to 61)   11 = power bill payment
                                      12 = gas bill payment
                                      21 = telephone bill payment
                                      31 = water bill payment
                                      32 = sewer bill payment
                                      41 = Mortgage/rent payment
                                      51 = Cable TV bill payment
                                      52 = Newspaper bill payment
                                      61 = General bill payment
*General bill payment will return the presence or absence of the payee chosen
TABLE:
PHONE SERIAL - (9 digits exact) ex. 650114999_
NUM. OF DEBIT CARDS ALLOWED THIS PHONE (2 digits max.) ex 01_
DEBIT CARD SWIPE account # - (19 digits max.) ex. 0788363_
BUTTON CODE 11_(POWER)
NUMBER OF FIELDS FOR THE ABOVE BUTTON CODE (MAX = 18 ie 3
companies with 3 locations each) ex. 6_
    PAYEE CODE 1 ex. 0000001_
    LOCATION CODE 1 ex. 0000001_
    PAYEE CODE 1 ex. 0000001_
    LOCATION CODE 2 ex. 0000002_
    PAYEE CODE 1 ex. 0000001_
    LOCATION CODE 3 ex. 0000003_
BUTTON CODE 12 (GAS)
    NUMBER OF FIELDS FOR THE ABOVE BUTTON CODE (MAX =
    18 ie 3 companies with 3 locations each) ex. 6_
    PAYEE CODE 1 ex. 0000001_
    LOCATION CODE 1 ex. 0000001_
    PAYEE CODE 1 ex. 0000001_
    LOCATION CODE 2 ex. 0000002_
    PAYEE CODE 1 ex. 0000001_
    LOCATION CODE 3 ex. 0000003_
BUTTON CODE 21 (TELEPHONE)
    NUMBER OF FIELDS FOR THE ABOVE BUTTON CODE (MAX =
    18 ie 3 companies with 3 locations each) ex. 6_
    PAYEE CODE 1 ex. 0000002_
    LOCATION CODE 1 ex. 0000001_
    PAYEE CODE 1 ex. 0000002_

APPENDIX A-continued

```
        LOCATION CODE 2 ex. 0000002__
        PAYEE CODE 1 ex. 0000002__
        LOCATION CODE 3 ex. 0000003__
BUTTON CODE 31 (WATER)
        NUMBER OF FIELDS FOR THE ABOVE BUTTON CODE (MAX =
        18 ie 3 companies with 3 locations each) ex. 6__
        PAYEE CODE 1 ex. 0000003__
        LOCATION CODE 1 ex. 0000001__
        PAYEE CODE 1 ex. 0000003__
        LOCATION CODE 2 ex. 0000002__
        PAYEE CODE 1 ex. 0000003__
        LOCATION CODE 3 ex. 0000003__
BUTTON CODE 32 (SEWER)
        NUMBER OF FIELDS FOR THE ABOVE BUTTON CODE (MAX =
        18 ie 3 companies with 3 locations each) ex. 6__
        PAYEE CODE 1 ex. 0000003__
        LOCATION CODE 1 ex. 0000001__
        PAYEE CODE 1 ex. 0000003__
        LOCATION CODE 2 ex. 0000002__
        PAYEE CODE 1 ex. 0000003__
        LOCATION CODE 3 ex. 0000003__
BUTTON CODE 41 (Mortgage/rent)
        NUMBER OF FIELDS FOR THE ABOVE BUTTON CODE (MAX =
        18 ie 3 companies with 3 locations each) ex. 4__
        PAYEE CODE 1 ex. 0000010__
        LOCATION CODE 1 ex. 0000001__
        PAYEE CODE 1 ex. 0000012__
        LOCATION CODE 2 ex. 0000001__
BUTTON CODE 51 (CABLE TV)
        NUMBER OF FIELDS FOR THE ABOVE BUTTON CODE (MAX =
        18 ie 3 companies with 3 locations each) ex. 6__
        PAYEE CODE 1 ex. 0000004__
        LOCATION CODE 1 ex. 0000001__
        PAYEE CODE 1 ex. 0000004__
        LOCATION CODE 2 ex. 0000002__
        PAYEE CODE 1 ex. 0000004__
        LOCATION CODE 3 ex. 0000003__
BUTTON CODE 52 (NEWSPAPER)
        NUMBER OF FIELDS FOR THE ABOVE BUTTON CODE (MAX =
        18 ie 3 companies with 3 locations each) ex. 6__
        PAYEE CODE 1 ex. 0000003__
        LOCATION CODE 1 ex. 0000001__
        PAYEE CODE 1 ex. 0000003__
        LOCATION CODE 2 ex. 0000002__
        PAYEE CODE 1 ex. 0000003__
        LOCATION CODE 3 ex. 0000003__
BUTTON CODE 61
        NUMBER OF FIELDS FOR THE ABOVE BUTTON CODE (MAX =
        UNLIMITED UP TO ELECTRONIC PAYEE TABLE) ex. 6__
        PAYEE CODE 1 ex 0000005__
        .
        .
        .
        PAYEE CODE (N-1)*
*The IVR will check the payee code entered to see if it is listed under button
61 in the customers validity table. If it is not listed then the IVR will tell the
customer that this is the 1st time he is paying this company and to please
input the customer account number to be included in the transaction record
captured for this payment transaction.
SAMPLE VALIDITY TABLE ENTRY
PHONE SERIAL NUMBER = 650114999
DEBIT CARD ACCT # = 00000000050788363
BUTTON CODE 11
NUMBER OF ENTRY FIELDS = 2
ELECTRONIC PAYEE TABLE ENTRY FOR 1ST POWER CO. = 0000001
                        (SCE&G from electronic payee table)
LOCATION TABLE ENTRY FOR 1st LOCATION. = 0000001
                        (Primary residence from location table)
BUTTON CODE 12
NUMBER OF ENTRY FIELDS = 2
ELECTRONIC PAYEE TABLE ENTRY FOR 1ST GAS CO. = 0000001
                        (SCE&G from electronic payee table)
LOCATION TABLE ENTRY FOR 1st LOCATION. = 0000001
                        (Primary residence from location table)
BUTTON CODE 21
NUMBER OF ENTRY FIELDS = 2
ELEC. PAYEE TABLE ENTRY FOR 1ST TELEPHONE CO. = 0000002
                        (Southern Bell from electronic payee table)
LOCATION TABLE ENTRY FOR 1st LOCATION. = 0000001
```

APPENDIX A-continued (Primary residence from location table)
BUTTON CODE 31
NUMBER OF ENTRY FIELDS = 2
ELECTRONIC PAYEE TABLE ENTRY FOR 1ST WATER CO. = 0000003
    (City of Columbia from electronic payee table)
LOCATION TABLE ENTRY FOR 1st LOCATION. = 0000001
    (Primary residence from location table)
BUTTON CODE 32
NUMBER OF ENTRY FIELDS = 2
ELECTRONIC PAYEE TABLE ENTRY FOR 1ST SEWER CO. = 0000003
    (City of Columbia from electronic payee table)
LOCATION TABLE ENTRY FOR 1st LOCATION. = 0000001
    (Primary residence from location table)
BUTTON CODE 41
NUMBER OF ENTRY FIELDS = 4
ELECTRONIC PAYEE TABLE ENTRY FOR 1ST MORTGAGE/RENT
    COMPANY = 0000010 (Midland Mort. from Payee table)
LOCATION TABLE ENTRY FOR 1st LOCATION. = 0000001
    (Primary residence from location table)
ELECTRONIC PAYEE TABLE ENTRY FOR 2nd MORTGAGE/RENT
    COMPANY = 0000012 (Fleet Mortgage from Payee table)
LOCATION TABLE ENTRY FOR 1st LOCATION. = 0000002
    (Rental Property from location table)
BUTTON CODE 51
NUMBER OF ENTRY FIELDS = 2
ELECTRONIC PAYEE TABLE ENTRY FOR 1ST CABLE TV = 0000004
    (CVI of Columbia, S.C. from payee table)
LOCATION TABLE ENTRY FOR 1st LOCATION. = 0000001
    (Primary residence from location table)
BUTTON CODE 52
NUMBER OF ENTRY FIELDS = 2
ELECTRONIC PAYEE TABLE ENTRY FOR 1ST NEWSPAPER = 0000005
    (STATE of Columbia, S.C. from payee table)
LOCATION TABLE ENTRY FOR 1st LOCATION. = 0000001
    (Primary residence from location table)
BUTTON CODE 61
NUMBER OF ENTRIES THAT THIS CUSTOMER HAS ACCOUNT
    NUMBERS ON FILE AT DART = 8
PAYEE TABLE ENTRY 1 = 0000001
PAYEE TABLE ENTRY 2 = 0000002
PAYEE TABLE ENTRY 3 = 0000003
PAYEE TABLE ENTRY 4 = 0000004
PAYEE TABLE ENTRY 5 = 0000005
PAYEE TABLE ENTRY 6 = 0000010
PAYEE TABLE ENTRY 7 = 0000011
PAYEE TABLE ENTRY 8 = 0000012
END-OF-TABLE = #

APPENDIX B
BUTTON#1 POWER/GAS 01 1. To pay the power company for electric or electric and gas press 1, to pay the gas company press 2, for other payment options press 3, to exit press 0.
11 2. (IF 0 is pressed) Goodbye. 2.5 (IF 3 is pressed) Go to message 10.
02 3. Please swipe your DART home banking debit card. (allow manual entry if card unable to be read)

(IVR checks customer table, payee table, and location name table (local or remote) for validity information and variable information).

03 4. (Validity failure) We're sorry, your phone is not activated or your debit card is not authorized. Please hang up and press the DART Home Banking helpdesk button.
11 5. Goodbye. 5.1 (If ECCG returns 3 payees) To pay Payee Co. 1 press 1, To pay Payee Co. 2 press 2, To pay Payee Co. 3 press 3. 5.2 (IF ECCG returns 3 locations for the selected payee) To pay Primary Residence press 1, To pay Second home press 2, To pay Rental property press 3.
04 6. Please enter the amount you want to pay, in dollars and cents with no decimal, followed by the pound key.
05 7. You have entered _____
06 8. If correct press 1. If incorrect press 0. (If 0 is pressed, loop back to msg. 4).
07 9. _____(info from payee table) power/gas company has been paid $ _____from your account.
06 10. If correct press 1. If incorrect press 0. (If 0 is pressed, loop back to msg. 4)
08 11. Your reference number is _____. To repeat press 1 (If 1 pressed loop back to Msg. 08). To continue press 2.

(Script continues to prompt for and verify the amount. The name of the selected company is played along with the amount, and the reference number is played with a repeat option. If there are multiple locations #5.2 above is repeated for each remaining location, adding, "Or continue, press 0" at the end. After locations are selected or rejected, if there are multiple payees, #5.1 is repeated, again with, "Or to continue, press 0" at the end. After this the caller may select the menu of all payment types.

09 12. Press 1 for more bill pay services. Press 0 to exit.
11 13. (If 0 pressed) Goodbye.
10 14. (If 1 pressed) For Power or gas press 1, for telephone press 2, for water or sewer press 3, for mortgage or rent press 4, for Cable TV or newspaper press 5, for other general payments press 6.

(NOTE: If previous transaction had a good card swipe—go to enter amount you want to pay after validity table, location table, and payee table information is retrieved for that button #.)

BUTTON #2 TELEPHONE 01 1. To pay your telephone bill press 1, for other payment options press 2, or press 0 to exit.
11 2. (IF 0 is pressed) Goodbye. 2.5 (IF 2 is pressed) go to message 10.
02 3. Please swipe your DART home banking debit card. (allow manual entry if card unable to be read)
03 4. (Validity failure) We're sorry, your phone is not activated or your debit card is not authorized. Please hang up and press the DART home banking helpdesk button.
11 5. Goodbye. 5.1 (If ECCG returns 3 payees) To pay Payee Co. 1 press 1, To pay Payee Co. 2 press 2, To pay Payee Co. 3 press 3. 5.2 (IF ECCG returns 3 locations for the selected payee) To pay Primary Residence press 1, To pay Second home press 2, To pay Rental property press 3.
04 6. Please enter the amount you want to pay, no decimal, followed by the pound key.
05 7. You have entered _____
06 8. If correct press 1. If incorrect press 0. (If 0 is pressed, loop back to msg. 4).
07 9. _____(info from payee table) telephone company has been paid $ _____from your account.
06 10. If correct press 1. If incorrect press 0. (If 0 is pressed, loop back to msg. 4)
08 11. Your reference number is _____. To repeat press 1 (If 1 pressed loop back to Msg. 08). To continue press 2.

(Script continues to prompt for and verify the amount. The name of the selected company is played along with the amount, and the reference number is played with a repeat option. If there are multiple locations #5.2 above is repeated for each remaining location, adding, "Or continue, press 0" at the end. After locations are selected or rejected, if there are multiple payees, #5.1 is repeated, again with, "Or to continue, press 0" at the end. After this the caller may select the menu of all payment types.

09 12. Press 1 for more bill pay services. Press 0 to exit.
11 13. (If 0 pressed) Goodbye.
10 14. (If 1 pressed) For Power or gas press 1, for telephone press 2, for water or sewer press 3, for mortgage or rent press 4, for Cable TV or newspaper press 5, for other general payments press 6.
(NOTE: If previous transaction had a good card swipe—go to enter amount you want to pay after validity table, location table, and payee table information is retrieved for that button #.)

BUTTON #3 WATER/SEWER 01 1. To pay your water or your water and sewer bill press 1, to pay your sewer bill Press 2, for other payment options press 3, or press 0 to exit.
11 2. (IF 0 is pressed) Goodbye. 2.5 (IF 3 is pressed) go to message 10.
02 3. Please swipe your DART home banking debit card. (allow manual entry if card unable to be read)
(IVR checks customer table, payee table, and location name table (local or remote) for validity information and variable information).

03 4. (Validity failure) We're sorry, your phone is not activated or your debit card is not authorized. Please hang up and press the DART home banking helpdesk button.
11 5. Goodbye. 5.1 (If ECCG returns 3 payees) To pay Payee Co. 1 press 1, To pay Payee Co. 2 press 2, To pay Payee Co. 3 press 3. 5.2 (IF ECCG returns 3 locations for the selected payee) To pay Primary Residence press 1, To pay Second home press 2, To pay Rental property press 3.
04 6. Please enter the amount you want to pay, no decimal, followed by the pound key.
05 7. You have entered _____
06 8. If correct press 1. If incorrect press 0. (If 0 is pressed, loop back to msg. 4).
07 9. _____(info from payee table) water/sewer company has been paid $ _____from your account.
06 10. If correct press 1. If incorrect press 0. (If 0 is pressed, loop back to msg. 4)
08 11. Your reference number is _____. To repeat press 1 (If 1 pressed loop back to Msg. 08). To continue press 2.

(Script continues to prompt for and verify the amount. The name of the selected company is played along with the amount, and the reference number is played with a repeat option. If there are multiple locations #5.2 above is repeated for each remaining location, adding, "Or continue, press 0" at the end. After locations are selected or rejected, if there are multiple payees, #5.1 is repeated, again with, "Or to continue, press 0" at the end. After this the caller may select the menu of all payment types.

09 12. Press 1 for more bill pay services. Press 0 to exit.
11 13. (If 0 pressed) Goodbye.
10 14. (If 1 pressed) For Power or gas press 1, for telephone press 2, for water or sewer press 3, for mortgage or rent press 4, for Cable TV or newspaper press 5, for other general payments press 6.
(NOTE: If previous transaction had a good card swipe—go to enter amount you want to pay after validity table, location table, and payee table information is retrieved that button #.)

TELEPAY (DART) HOME BANKING

BUTTON #4 MORTGAGE or RENT 01 1. If you would like to pay your mortgage or rent press 1, for other payment options, press 2 or press 0 to exit.
11 2. (IF 0 is pressed) Goodbye. 2.5 If 2 pressed, go to message 10.
02 3. Please swipe your DART home banking debit card. (allow manual entry if card unable to be read)

(IVR checks customer table, payee table, and location name table (local or remote) for validity information and variable information).

03 4. (Validity failure) We're sorry, your phone is not activated or your debit card is not authorized. Please hang up and press the DART home banking helpdesk button.
11 5. Goodbye. 5.1 (If ECCG returns 3 payees) To pay Payee Co. 1 press 1, To pay Payee Co. 2 press 2, To pay Payee Co. 3 press 3. 5.2 (IF ECCG returns 3 locations for the selected payee) To pay Primary Residence press 1, To pay Second home press 2, To pay Rental property press 3.
04 6. Please enter the amount you want to pay, no decimal, followed by the pound key.
05 7. You have entered _____
06 8. If correct press 1. If incorrect press 0. (If 0 is pressed, loop back to msg. 4).
07 9. _____(info from payee table) mortgage or rental company has been paid $ _____from your account.
06 10. If correct press 1. If incorrect press 0. (If 0 is pressed, loop back to msg. 4)

08 11. Your reference number is _____. To repeat press 1 (If 1 pressed loop back to Msg. 08). To continue press 2.

(Script continues to prompt for and verify the amount. The name of the selected company is played along with the amount, and the reference number is played with a repeat option. If there are multiple locations #5.2 above is repeated for each remaining location, adding, "Or continue, press 0" at the end. After locations are selected or rejected, if there are multiple payees, #5.1 is repeated, again with, "Or to continue, press 0" at the end. After this the caller may select the menu of all payment types.

09 12. Press 1 for more bill pay services. Press 0 to exit.
11 13. (If 0 pressed) Goodbye.
10 14. (If 1 pressed) For Power or gas press 1, for telephone press 2, for water or sewer press 3, for mortgage or rent press 4, for Cable TV or newspaper press 5, for other general payments press 6.

(NOTE: If previous transaction had a good card swipe—go to enter amount you want to pay after validity table, location table, and payee table information is retrieved for that button #.)

TELEPAY (DART) HOME BANKING
BUTTON #5 Cable TV/Newspaper 01 1. If you would like to pay your cable TV, bill press 1, to pay your Newspaper bill, Press 2, or press 0 to exit.
2. (IF 0 is pressed) Goodbye. 2.5 If 2 pressed, go to message 10.
02 3. Please swipe your DART home banking debit card. (allow manual entry if card unable to be read)

(IVR checks customer table, payee table, and location name table (local or remote) for validity information and variable information).

03 4. (Validity failure) We're sorry, your phone is not activated or your debit card is not authorized. Please hang up and press the DART home banking helpdesk button.
11 5. Goodbye. 5.1 (If ECCG returns 3 payees) To pay Payee Co. 1 press 1, To pay Payee Co. 2 press 2, To pay Payee Co. 3 press 3. 5.2 (IF ECCG returns 3 locations for the selected payee) To pay Primary Residence press 1, To pay Second home press 2, To pay Rental property press 3.
04 6. Please enter the amount you want to pay, no decimal, followed by the pound key.
05 7. You have entered _____
06 8. If correct press 1. If incorrect press 0. (If 0 is pressed, loop back to msg. 4).
07 9. _____(info from payee table) cable TV/Newspaper company has been paid $ _____ from your account.
06 10. If correct press 1. If incorrect press 0. (If 0 is pressed, loop back to msg. 4)
08 11. Your reference number is _____. To repeat press 1 (If 1 pressed loop back to Msg. 08). To continue press 2.

(Script continues to prompt and verify the amount. The name of the selected company is played along with the amount and the reference number is played with a repeat option. If there are multiple locations #5.2 above is repeated for each remaining location, adding, "Or continue, press 0" at the end. After locations are selected or rejected, if there are multiple payees, #5.1 is repeated, again with, "Or to continue, press 0" at the end. After this the caller may select the menu of all payment types.

09 12. Press 1 for more bill pay services. Press 2 to exit.
11 13. (If 2 pressed) Goodbye.
10 14. (If 1 pressed) For Power or gas press 1, for telephone press 2, for water or sewer press 3, for mortgage or rent press 4, for Cable TV or newspaper press 5, for other general payments press 6.

(NOTE: If previous transaction had a good card swipe—go to enter amount you want to pay after validity table, location table, and payee table information is retrieved/or that button #.)

TELEPAY (DART) HOME BANKING
BUTTON #6 GENERAL PAYMENTS 23 1. You have chosen to make a payment to a company listed in the general payments guide. Press 1 to continue, press 2 for other payment options, or press 0 to exit.
11 2. (IF 0 is pressed) Goodbye. 2.1 If 1 pressed, go to message 10. 2.2 Please enter the company code.
05 3. You have entered.
15 4. If correct press 1. To change press 2 (If 2 pressed, loop back to 2.1)
02 5. Please swipe your DART home banking debit card. (allow manual entry if card unable to be read)

(IVR checks validity table, payee table, and location name table (local or remote) for validity information, variable information, and if 1st time paid).

03 4. (Validity failure) We're sorry, your phone is not activated or your debit card is not authorized. Please hang up and press the DART home banking helpdesk button.
11 7. Goodbye.
(IF 1st time customer has paid this payee ask for 7.6 information and confirm. Indicated by payee number not being in validity table). 7.6 Please enter your account number for this company, followed by the pound sign. 7.7 You entered _____(correct press 1, reenter press 2)
04 8. Please enter the amount you want to pay, no decimal, followed by the pound key.
05 9. You have entered _____
06 10. If correct press 1. If incorrect press 0. (If 0 is pressed, loop back to msg. 4).
07 11. _____(info from payee table) company will be paid $ _____ from your account.
06 12. If correct press 1. If incorrect press 0. (If 0 is pressed, loop back to msg. 4)
13. Your reference number is _____. To repeat press 1 (If 1 pressed loop back to Msg. 08). To continue press 2. 13.1 Press 1 to pay another company listed in the general payments guide, Press 2 for other payment options or Press 0 to exit.
11 14. (If 0 pressed) Goodbye.
10 16. (If 2 pressed) For Power or gas press 1, for telephone press 2, for water or sewer press 3, for mortgage or rent press 4, for Cable TV or newspaper press 5, for other general payments press 6.

(NOTE: If previous transaction had a good card swipe—go to enter amount you want to pay after validity table, location table, and payee table information is retrieved for that button #.)

What is claimed is:
1. A system for use by a multiplicity of users to perform a variety of transactions through a system operator and effect collection of payment for said transactions by said system operator, said system comprising:

a plurality of telephone instruments respectively having a telephone identifier, said telephone instruments further including means for inputting a user identifier;

each of said telephone instruments further having a plurality of user actuators thereon respectively indicative of a particular transaction, said transactions including bill payment, product/service requests and closed network long distance telephone service;

system processor means in communication with said respective of said telephone instruments upon actuation of a selected user actuator by said user, said system processor means operative to receive at least said telephone identifier from said telephone instrument;

said system processor means being further able to determine which type of said transactions is being requested based on actuation of said selected user actuator;

payment means for effecting payment of bills rendered by third parties to said user on behalf of said user;

product/service means for effecting requests of products/services on behalf of said user;

long distance means for effecting long distance telephone calls by said user from said telephone instrument through a closed network;

collection means for collecting payment for said transactions based on receipt of at least said telephone identifier from said telephone instrument; and wherein said system processor includes:
  (a) at least one gateway computer having table means for storing therein a plurality of tables respectively corresponding to one of maid telephone instruments;
  (b) said gateway computer further having validity processor means for checking whether a request for bill payment from one of said telephone instruments is valid, said validity processor means operative to check said request for bill payment by receiving both of said telephone identifier and said user identifier and comparing said identifiers with data in a corresponding table;
  (c) a central computer in communication with said at least one gateway computer and operative to forward a payment command to said payment means, said central computer having a complete database containing sufficient information regarding said user and said third party to effect bill payment thereto as requested.

2. A system as set forth in claim 1, wherein said long distance means includes:

means for logging information regarding calls made from a respective of said telephone instruments;

means for dynamically analyzing said calls made from a respective of said telephone instruments and determining a rate according to a predetermined criteria; and means in communication with said collection means for effecting payment for said calls from said user to said system operator.

3. A system as set forth in claim 1, wherein said means of said telephone instrument for inputting a user identifier is a wallet card swipe reader.

4. A system as set forth in claim 1, wherein said system includes means for returning to said user a reference number indicating receipt of a valid request for bill payment by said system operator.

5. A system as set forth in claim 1, wherein said at least one gateway computer includes a plurality of said gateway computers functionally arranged in parallel to receive transaction requests from said telephone instruments.

6. A system as set forth in claim 5, including a plurality of integrated voice response units functionally connected between said telephone instruments and said gateway computers to facilitate response units being functionally arranged in parallel with one another.

7. A system as set forth in claim 1, wherein said gateway computer further includes log means for storing information regarding each said transaction received during a selected period and forwarding said information to said central computer in batch at a predetermined time.

8. A system as set forth in claim 1, wherein said collection means includes means for electronically transferring funds from a bank account of said user to a bank account of said system operator.

9. A system as set forth in claim 1, wherein said payment means includes:

means for electronically transferring funds from a bank account of said system operator to a bank account of said third party; and means for producing a check drawn on said bank account of said system operator to said third party.

10. A system for use by a multiplicity of users to request payment by a system operator of bills rendered by a third party to said users, said system comprising:

a plurality of telecommunication instruments respectively having an instrument identifier, said telecommunication instruments further including means for inputting a user identifier;

at least one gateway computer having table means for storing therein a plurality of tables respectively corresponding to one of said telephone instruments;

said gateway computer further having gateway processor means for validity checking requests for bill payment from said telecommunication devices, said gateway processor means operative to receive both of said telecommunication identifier and said user identifier and comparing said identifiers with data in a corresponding table;

a central computer in operative communication with said gateway computer, said central computer having a complete database containing sufficient information regarding said user and a payee to effect bill payment thereto as requested;

payment means in communication with said central computer and operative upon receipt of a payment command therefrom for effecting payment to said third parties of said bills; and collection means for collecting payment for said transactions.

11. A system as set forth in claim 10, wherein said collection means includes means for electronically transferring funds from a bank account of said user to a bank account of said system operator.

12. A system as set forth in claim 11, wherein said means of said telecommunication instrument for inputting a user identifier is a wallet card swipe reader.

13. A system as set forth in claim 12, wherein respective of said telecommunications instruments are telephone instruments.

14. A system as set forth in claim 13, wherein said system includes means responsive to said gateway computer for returning to said user by voice a reference number indicating receipt and acceptance by said system operator of a request for bill payment.

15. A system as set forth in claim 10, wherein said at least one gateway computer includes a plurality of said gateway computers functionally arranged in parallel to receive transaction requests from said telephone instruments.

16. A system as set forth in claim 15, including a plurality of integrated voice response units functionally connected between said telecommunications instruments and said gateway computers to facilitate communication therebetween, said integrated voice response units being functionally arranged in parallel with one another.

17. A system as set forth in claim 10, wherein gateway computer further includes log means for storing information regarding a plurality of said requests received during a selected period as abbreviated request bundles and forwarding said abbreviated request bundles to said central computer in batch at a predetermined time.

18. A system as set forth in claim 12, wherein said payment means includes:

first means for electronically transferring funds from a bank account of said system operator to a bank account of said third party; and second means for producing a check drawn on said bank account of said system operator to said third party.

19. A system as set forth in claim 18, wherein said first means includes supplemental means for notifying said third party of an electronic funds transfer to facilitate proper crediting of an account of said user.

20. A computer-based method of effecting payment of bills rendered to consumers by third parties on behalf of said consumers, said method comprising the steps of:

(a) providing a telephone instrument to respective of said consumers, said telephone instrument including means for communicating a telephone identifier and further including a wallet card swipe reader;

(b) providing a wallet card to respective of said consumers, said wallet card having a user identifier magnetically encoded thereon;

(c) electronically receiving a request to pay a bill, said request including said telephone identifier and said user identifier;

(d) checking said telephone identifier and said user identifier against a validity table to determine whether said request is valid;

(e) if said request is not valid, denying said request;

(f) if said request is valid, receiving an amount to be paid to said third party from inputs entered on a keypad of said telephone instrument and forming an abbreviated request bundle;

(g) correlating said abbreviated request bundle with a complete database containing sufficient information regarding said user and said third party to effect bill payment thereto as requested; and (h) paying said bill rendered to said user by said third party on said user's behalf.

21. A method as set forth in claim 20, including the steps of:

(i) creating in a first computer a log containing a plurality of said abbreviated request bundles accrued from a plurality of said telephone instruments over a selected period; and (j) at a predetermined time, forwarding said plurality of said abbreviated request bundles from said first computer to a second computer for respective correlation with said complete database.

22. A method as set forth in claim 20, further comprising the step of providing to said user a transaction identifier to reference receipt and acceptance of said request.

* * * * *